(12) United States Patent
Urard

(10) Patent No.: US 7,139,865 B2
(45) Date of Patent: Nov. 21, 2006

(54) LIFO TYPE DATA STORAGE DEVICE INCORPORATING TWO RANDOM ACCESS MEMORIES

(75) Inventor: Pascal Urard, Theys (FR)

(73) Assignee: STMicroelectronics S.A., Montrouge (FR)

( * ) Notice: Subject to any disclaimer, the term of this patent is extended or adjusted under 35 U.S.C. 154(b) by 361 days.

(21) Appl. No.: 10/669,886

(22) Filed: Sep. 24, 2003

(65) Prior Publication Data

US 2004/0117542 A1    Jun. 17, 2004

(30) Foreign Application Priority Data

Oct. 11, 2002   (FR) .................................. 02 12663

(51) Int. Cl.
*G06F 12/00*   (2006.01)

(52) U.S. Cl. ................... 711/104; 711/167; 365/189.04

(58) Field of Classification Search ...................... None
See application file for complete search history.

(56) References Cited

U.S. PATENT DOCUMENTS

| | | | |
|---|---|---|---|
| 5,206,834 A | | 4/1993 | Okitaka et al. |
| 5,287,309 A | * | 2/1994 | Kai ........................ 365/189.04 |
| 5,671,400 A | * | 9/1997 | Kiggens et al. ................ 703/23 |
| 6,178,472 B1 | * | 1/2001 | Carpenter et al. ............. 710/54 |
| 6,282,633 B1 | * | 8/2001 | Killian et al. ................ 712/208 |
| 6,389,525 B1 | * | 5/2002 | Reichert et al. ............ 711/217 |
| 2001/0049807 A1 | | 12/2001 | Kim |
| 2002/0099747 A1 | * | 7/2002 | Timko et al. ................ 708/300 |
| 2002/0154625 A1 | * | 10/2002 | Ma ............................. 370/351 |

FOREIGN PATENT DOCUMENTS

| | | |
|---|---|---|
| EP | 0 274 323 | 7/1988 |
| EP | 0 319 430 | 6/1989 |

OTHER PUBLICATIONS

Preliminary Search Report, FR 0212663, dated Jul. 11, 2003.

* cited by examiner

*Primary Examiner*—Mano Padmanabhan
*Assistant Examiner*—Kaushik Patel
(74) *Attorney, Agent, or Firm*—Jenkens & Gilchrist, P.C.

(57) ABSTRACT

A LIFO type data storage device of $2^N$ depth, N being an integer, includes two random access memories each having at least $2^{N-1}$ locations for storing data. A controller controls the reading and writing of data in one or the other of the two memories, or the direct transmission of data to multiplexing means. Outputs of the two memories are also connected to the multiplexing means and the output of the device is connected to the multiplexing means via a sampler.

15 Claims, 3 Drawing Sheets

LIFO TYPE DATA STORAGE DEVICE INCORPORATING TWO RANDOM ACCESS MEMORIES

PRIORITY CLAIM

The present application claims priority from French Application for Patent No. 02 12663, filed Oct. 11, 2002, the disclosure of which is hereby incorporated by reference.

BACKGROUND OF THE INVENTION

1. Technical Field of the Invention

1. The present invention relates to a LIFO ("Last In, First Out") storage device, otherwise known as a reverse stack.

2. Description of Related Art

2. A LIFO type storage device is characterized by a depth P, P being an integer which may be of the form $2^N$, N being an integer. The function of the device is to store a succession of data produced by a data source in a determined chronological order, and to retrieve these data in successive sequences of P data, the chronological order of data retrieval within each sequence being the reverse of the chronological order of data production by the source. Storage by the device of data produced by the source continues simultaneously with data retrieval, in a timed manner according to a series of successive further defined time intervals. Thus, under the nominal operating conditions of the storage device, recording a datum and retrieving another datum takes place at each time interval.

In a manner known to a person skilled in the art, a LIFO type storage device of depth P may consist of two identical single port random access memories (SP-RAM), each with P addresses, to which the sequences of P data are directed. In this type of device, the data from the same sequence may be directed to the same memory, alternating between the two RAM memories for two successive sequences of data. Thus, at each timing interval of the operation of the storage device, a datum from a sequence being produced by the data source is written to one of the two SP-RAMs, while another datum from the immediately previous data sequence is simultaneously read in the other SP-RAM. To achieve reverse stack operation, each SP-RAM is read in the address order of this SP-RAM in the reverse order of the same addresses in which the data have been previously written to this SP-RAM.

This type of storage device accordingly requires two SP-RAMs, each having at least as many addresses as depth P of the device. This large storage capacity entails a large cost, due in particular to the surface area of semiconductor substrate necessary for producing the corresponding memory modules.

The storage capacity necessary for a LIFO type storage device of depth P can be reduced to a single RAM memory with P addresses, by using a DP-RAM (or Dual Port-RAM) type memory. At each timing interval of the storage device's operation, a datum from a sequence being produced by the data source can then be written to this DP-RAM, whilst another datum is simultaneously read in this DP-RAM from the immediately previous data sequence. This reading and writing take place at two successive addresses in an address scanning of the DP-RAM. To achieve reverse stack operation, the data from the same sequence are written then read in the DP-RAM by scanning the addresses of the DP-RAM in reverse orders between reading and writing the data of this sequence. Under these circumstances, a single memory module with P addresses is sufficient.

One drawback of this latter embodiment of LIFO type storage devices lies in the use of DP-RAM memory modules. This is because DP-RAM memory modules are more expensive and bulkier than SP-RAM memory modules for the same storage capacity. They are therefore especially limiting for the production of small, cheap circuits.

SUMMARY OF THE INVENTION

The present invention proposes a LIFO type storage device of depth $P=2^N$, N being an integer, comprising two RAM memories each capable of having upwards of P/2 data entry addresses.

A storage device according to the invention comprises:

two random access memories each having at least $2^{N-1}$ locations for storing data at respective addresses, N being an integer greater than 1, a data input connected to a data source, a command input, an address input and an output;

multiplexing means having first and second data inputs respectively connected to the data outputs of the two memories, a third data input connected to the data source and an output reproducing data present at one of said first, second and third data inputs, selected by switching signals;

a controller for issuing electrical signals, within successive time intervals, at outputs of the controller including two access command outputs respectively connected to the command inputs of the two memories, two address outputs respectively connected to the address inputs of the two memories and at least one switching command output for issuing said switching signals; and means for sampling the multiplexing means output at the beginning of each time interval and producing device output data.

The controller is set up in the invention's storage device to issue in the course of two consecutive sequences of $2^N$ time intervals:

on each of the two access command outputs, and for at least time intervals distinct from the boundaries of the two sequences, alternate read and write access commands, a write access command being issued on one of said access command outputs while a read access command is issued on the other access command output and vice versa;

on each of the two address outputs, increasing addresses during one of the two sequences and decreasing addresses during the other sequence, such that, for at least time intervals distinct from the boundaries of the two sequences, the address input of each memory receives the same address in the course of two consecutive time intervals of each sequence during which the command input of said memory receives a read access command and then a write access command; and on each switching command output, switching signals set so that in the course of each sequence, the sampling means produce data originating from the source in a reverse chronological order from the chronological order of arrival of said data from the source.

A first advantage of a storage device according to the invention lies in its especially low energy consumption. This low consumption results in particular from its possible operation with a total of just $2^N$ memory locations, i.e. as many as the depth of the corresponding reverse stack, as defined earlier.

A second advantage of a storage device according to the invention lies in its possible operation with SP-RAM type memories. This results in a significant saving in semiconductor substrate surface area, and consequently an especially low cost for the device.

A storage device according to the invention can be used for various types of data. In particular, the data can be successions of bits such as bytes, programs or collections of information elements having to be produced in a reverse chronological order to that of arrival of these same data from a source appropriate to each type of data. So both of the memories of the device must have locations of a size appropriate to the type of data stored.

In a preferred embodiment of the invention, the switching signals are issued in such a way that the output of the multiplexing means reproduces data present at said third data input, during at least one time interval at a boundary of each sequence. In this embodiment and during the time intervals concerned, the data issued by the source are reproduced at the output of the multiplexing means with a delay due to the multiplexing means only. The delay introduced by the storage device between the sequences of data produced at the output of the multiplexing means and the sequences of the same data issued by the source is then minimal, while being compatible with the operation of the reverse stack.

Storage devices according to the invention can be produced with different types of memories, including, in particular, deferred or immediate read SP-RAM memories. For deferred read SP-RAM memories, the data read are produced at the memory output during the time interval immediately following the time interval during which the command input of said memory receives a read access command and the address input of said memory receives an address. This first type of memory enables especially fast operation of the storage device. By contrast, data read in an immediate read SP-RAM memory are produced at the memory output during the same time interval during which the command input receives a read access command and the address input receives an address. This second type of memory can be adapted for storage devices incorporated into circuits further including memory modules of this type. It is, in fact, sometimes advantageous to use a single type of memory within the same circuit.

The invention also relates to a method of data storage and retrieval using a storage device as previously disclosed.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
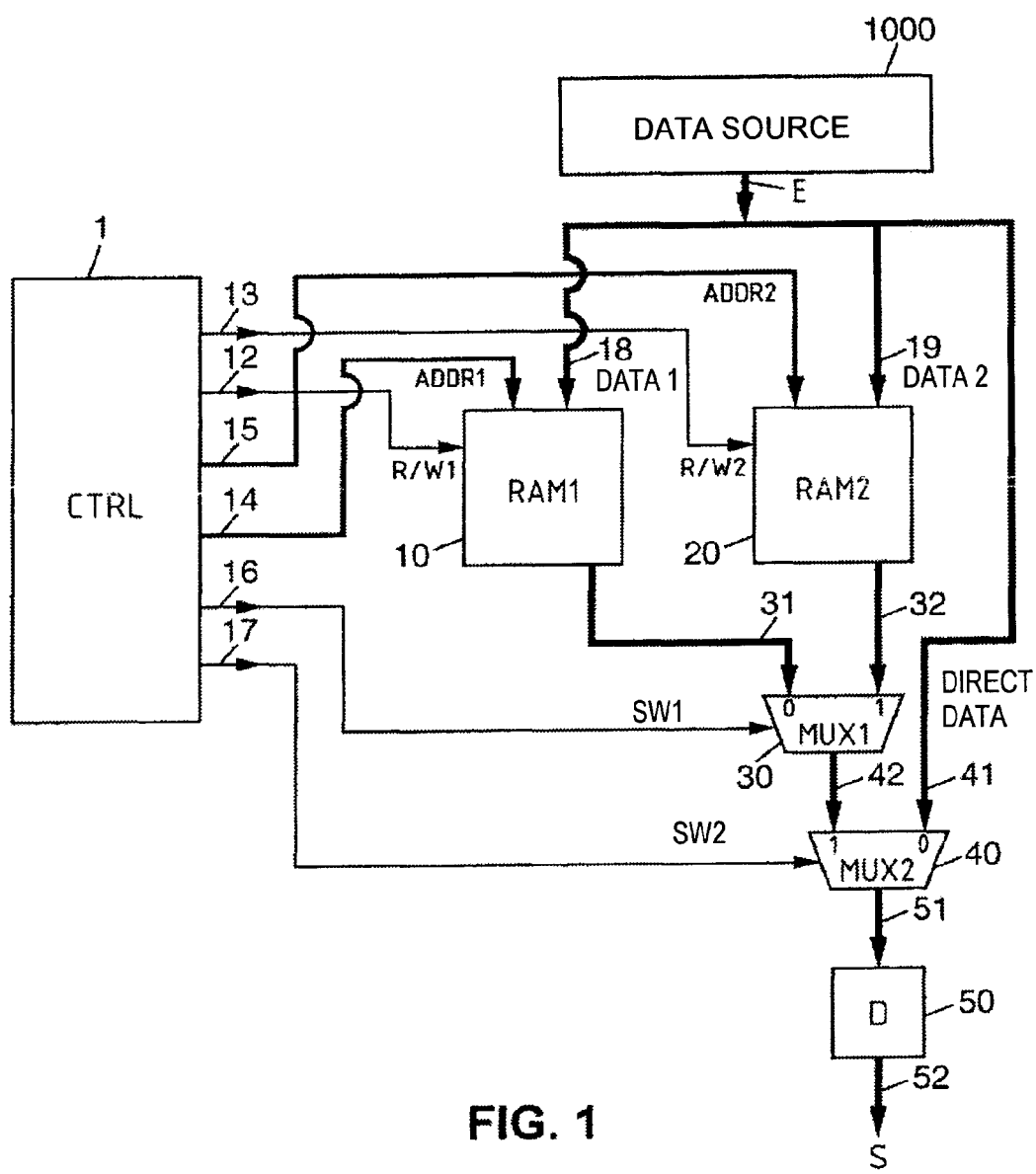
FIG. 1 represents the architecture of a storage device according to the present invention.

The circuit architecture of FIG. 1 is common to both embodiments subsequently disclosed. The first embodiment uses two deferred read SP-RAM type memory modules, and the second embodiment uses two immediate read SP-RAM type memory modules.

According to FIG. 1, the storage device possesses a data input E connected to a data source referenced 1000. This data input E is connected via respective data buses to the data input 18 of a first memory 10 of one of the types mentioned above, to the data input 19 of a second memory 20 of the same type, and to a first data input 41 of a multiplexer 40, marked MUX2 in FIG. 1. The two memories are marked RAM1 and RAM2 in FIG. 1.

The outputs of the two memories 10, 20 are connected respectively via data buses to a first input 31 and to a second input 32 of a multiplexer 30, marked MUX1 in FIG. 1. The data output of the multiplexer 30 (MUX1) is connected to a second data input 42 of the multiplexer 40 (MUX2).

The output of the multiplexer 40 (MUX2) is connected to the input 51 of a flip-flop D referenced 50 in FIG. 1, whose output 52 constitutes the data output S of the data storage device.

According to a form of operation explained later on, the data issued by the source 1000 are distributed between a first group of data, marked DATA1 in FIG. 1, which pass through memory 10, a second group of data, marked DATA2, which pass through memory 20, and data transmitted directly between the input E of the device and the multiplexer 40 (MUX2).

A clock, not shown, connected to the controller 1, to both multiplexers 30, 40 and to the flip-flop D 50 times the overall operation of the device according to a defined series of time intervals. The timing of the operation may also possibly be defined by interrogation and trigger signals transmitted to certain components of the storage device.

A controller 1 responsible for controlling the storage device has the following outputs:

first and second access command outputs 12 and 13 connected to respective command inputs of memory 10 (RAM1) and memory 20 (RAM2). Each of the outputs 12, 13 transmits a binary access command R/W1 or R/W2 respectively, during each time interval. By way of example, a value 0 commands a write access in the memory 10, 20 concerned, and a value 1 commands a read access;

first and second address outputs 14 and 15 connected to respective address inputs of the memories 10 and 20 via respective address buses. The addresses ADDR1 and ADDR2 of the memories 10 and 20 thus transmitted are coded by the controller 1 over N−1 bits, between 0 and $2^{N-1}-1$;

first and second switching command outputs 16 and 17 connected to the respective switching command inputs of the multiplexers 30 and 40. By way of example, the switching signals SW1 and SW2 produced respectively at the outputs 16 and 17 each have, for each time interval, a binary value of 0, when the output of the multiplexer 30/40 concerned is intended to reproduce the datum received at said first input 31/41 of this multiplexer, or a binary value of 1 when the output of this multiplexer 30/40 is intended to reproduce the datum received at said second input 32/42 of this multiplexer.

Furthermore, each multiplexer 30/40 instantaneously reproduces at its output the data received at its first input 31/41 or at its second input 32/42 according to the switching signal SW1/SW2 transmitted at its switching command input. Thus, for each time interval, the output of each multiplexer 30, 40 reproduces the data received during this same time interval at one of its two inputs.

The invention is now disclosed in detail according to a first embodiment using two deferred read SP-RAM type memory modules.

Figure 2:
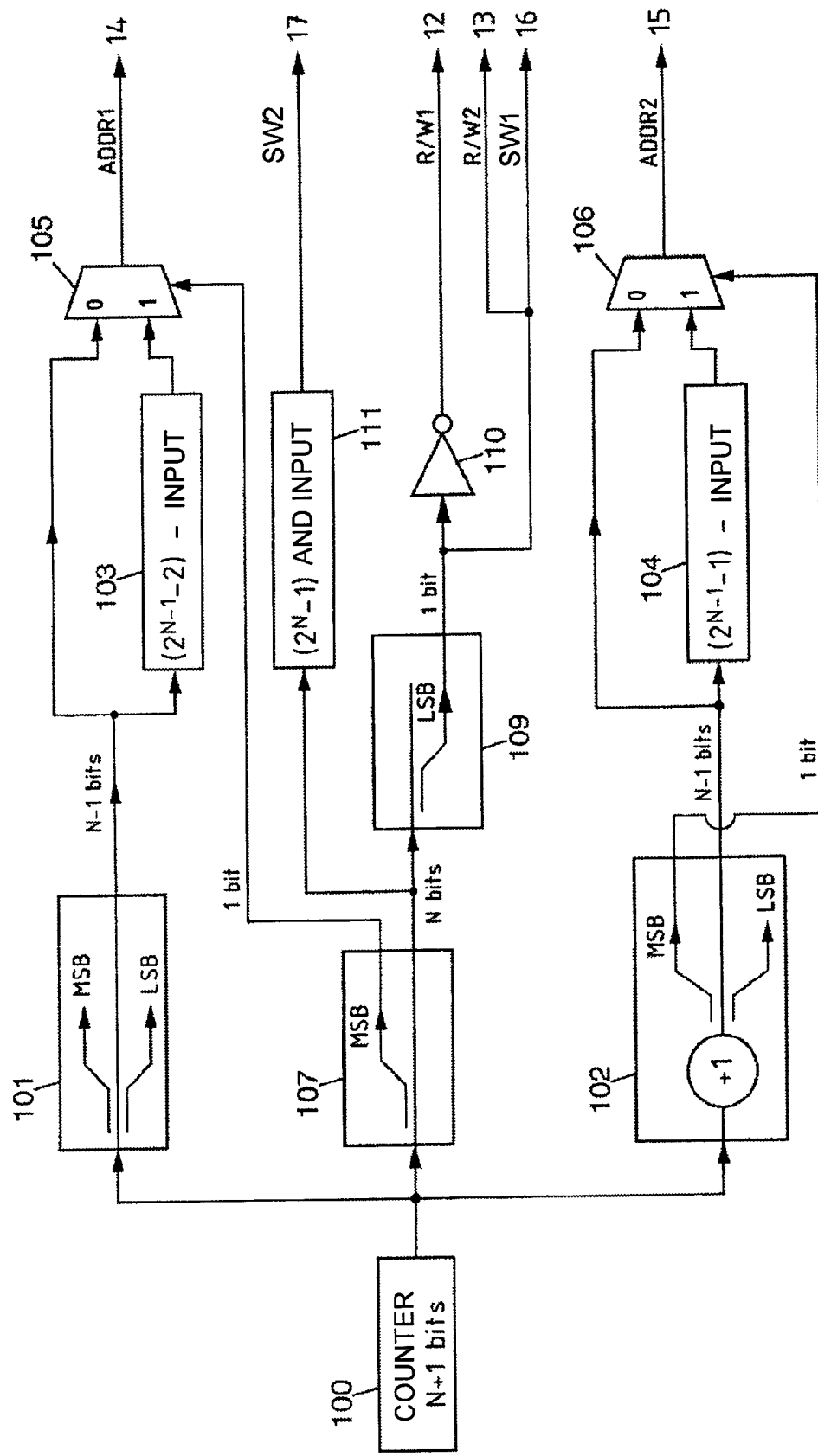
FIG. 2 is a functional diagram of a controller adapted for a storage device according to FIG. 1 using deferred read SP-RAM type memories.

Inside the controller 1 corresponding to FIG. 2, a cyclic counter 100 produces a count number for the time interval in progress. This count number, over N+1 bits, i.e. between 0 and $2^{N+1}-1$ bits, reverts to 0 when the value $2^{N+1}$ is reached. The counter 100 is synchronized with the operation timing system of the overall device via a link not shown.

A first circuit branch within the controller 1, connected to the output of the counter 100, generates the access address ADDR1 to the memory 10 (RAM1) for each time interval. In this first branch, a first partial count number for the time interval in progress, over N−1 bits, is obtained by removing the most significant bit (MSB) and the least significant bit (LSB) from the count number issued by the counter 100. The removal of the end bits of the count number is done by the separator 101.

The first partial count number is then sent directly to a first input of a multiplexer 105 inside the controller 1. A digital operator 103, operating over N−1 bits, subtracts the first partial count number from the number $2^{N-1}-2$ and sends the result to a second input of the multiplexer 105.

The output of the multiplexer 105 is connected to the output 14 of the controller 1.

A different separator 107, arranged at the output of the counter 100, isolates the most significant bit (MSB) of the count number for the time interval in progress. This bit is then sent to a command input of the multiplexer 105, which instantaneously reproduces the signal received on its first or its second input respectively, at the output 14 when the command input bit is equal to 0 or 1. The signal produced at the output 14 for each time interval is the access address ADDR1 to the memory 10 (RAM1).

The address ADDR1 thus obtained, coded over N−1 bits, is equal to the first partial count number during the time intervals respectively numbered from 0 to $2^N-1$, and equal to $2^{N-1}-2$ from which the first partial count number is subtracted during the time intervals respectively numbered from $2^N$ to $2^{N+1}-1$.

A second circuit branch within the controller 1, also connected to the output of the counter 100, supplies the access address ADDR2 to the memory 20 (RAM2) for each time interval. In this second branch, a second partial count number for the time interval in progress, over N−1 bits, is obtained by adding 1, with a constant number of bits, to the count number issued by the counter 100, then subtracting the most significant bit (MSB) and the least significant bit (LSB). When 1 is added, over N+1 bits, the result reverts to the value 0 when the value $2^{N+1}$ is reached. The second partial count number is obtained by the operator 102 shown in FIG. 2.

The second partial count number is then sent directly to a first input of a multiplexer 106 inside the controller 1. A digital operator 104, operating on N−1 bits, subtracts the second partial count number from the number $2^{N-1}-1$ and sends the result to a second input of the multiplexer 106.

The output of the multiplexer 106 forms the output 15 of the controller 1.

At the output of the operator 102, the most significant bit (MSB) of the second partial count number is further sent to a command input of the multiplexer 106, which instantaneously reproduces the signal received on its first or its second input respectively, at the output 15 when the command input bit is equal to 0 or 1. The signal produced at the output 15 for each time interval is the access address ADDR2 to the memory 20 (RAM2).

The address ADDR2 thus obtained, coded over N−1 bits, is equal to the second partial count number during the time intervals respectively numbered from 0 to $2^{N-2}$, or numbered $2^{N+1}-1$, and equal to $2^{N-1}-1$ from which the second partial count number is subtracted during the time intervals respectively numbered from $2^N-1$ to $2^{N+1}-2$, or numbered $2^N-1$.

A separator 109, connected to the output of the separator 107, and connected via its output to the outputs 16 and 13 of the controller 1, isolates the least significant bit (LSB) of the count number for the time interval in progress. The bit issued by the separator 109 then forms the switching signal SW1 issued by the output 16 of the controller 1, and the access command R/W2 issued by the output 13. An inverter 110 connected between the output of the operator 109 and the output 12 of the controller 1 produces the access command R/W1. In this way, for each time interval, the access command R/W1, coded over 1 bit, is the opposite of the least significant bit of the count number for the time interval in progress.

Finally, a logical "AND" operator 111, connected to the output of the separator 107, receives at its input the count number for the time interval in progress, reduced to the N least significant bits, and compares it to $2^N-1$. The output of the logical operator 111 is connected to the output 17 of the controller 1, supplying the switching signal SW2.

Table 1 below gives the values of the first and second partial count numbers, together with the values of the outputs 12 to 17 of the controller 1 disclosed above, for each time interval. For this table, by way of example, N is taken as equal to 3. A sequence of time intervals then includes 8 successive time intervals, numbered from 0 to 7 for the first sequence by the counter 100, and from 8 to 15 for the second sequence.

TABLE 1

| Time interval counter (100) | First Partial Number (101) | W/R1 (12) | ADDR1 (14) | SW1 (16) | Second partial number (102) | W/R2 (13) | ADDR2 (15) | SW2 (17) |
|---|---|---|---|---|---|---|---|---|
| 0  | 00 | 1 | 0 | 0 | 00 | 0 | 0 | 0 |
| 1  | 00 | 0 | 0 | 1 | 01 | 1 | 1 | 0 |
| 2  | 01 | 1 | 1 | 0 | 01 | 0 | 1 | 0 |
| 3  | 01 | 0 | 1 | 1 | 10 | 1 | 2 | 0 |
| 4  | 10 | 1 | 2 | 0 | 10 | 0 | 2 | 0 |
| 5  | 10 | 0 | 2 | 1 | 11 | 1 | 3 | 0 |
| 6  | 11 | 1 | 3 | 0 | 11 | 0 | 3 | 0 |
| 7  | 11 | 0 | 3 | 1 | 00 | 1 | 3 | 1 |
| 8  | 00 | 1 | 2 | 0 | 00 | 0 | 3 | 0 |
| 9  | 00 | 0 | 2 | 1 | 01 | 1 | 2 | 0 |
| 10 | 01 | 1 | 1 | 0 | 01 | 0 | 2 | 0 |
| 11 | 01 | 0 | 1 | 1 | 10 | 1 | 1 | 0 |
| 12 | 10 | 1 | 0 | 0 | 10 | 0 | 1 | 0 |
| 13 | 10 | 0 | 0 | 1 | 11 | 1 | 0 | 0 |

TABLE 1-continued

| Time interval counter (100) | First Partial Number (101) | W/R1 (12) | ADDR1 (14) | SW1 (16) | Second partial number (102) | W/R2 (13) | ADDR2 (15) | SW2 (17) |
|---|---|---|---|---|---|---|---|---|
| 14 | 11 | 1 | 3 | 0 | 11 | 0 | 0 | 0 |
| 15 | 11 | 0 | 3 | 1 | 00 | 1 | 0 | 1 |
| 16 = 0 | 00 | 1 | 0 | 0 | 00 | 0 | 0 | 0 |

In Table 1, the first and second partial count numbers are shown as binary numbers.

As shown in the last row of Table 1, identical to the row corresponding to the number 0 time interval, all the values of the time interval counters and outputs 12–17 are repeated cyclically, all being obtained from the cyclic count number, with a period of $2^{N+1}$, issued by the counter 100.

It will be obvious to the person skilled in the art that the same table of values may be obtained with a controller 1 having an internal structure other than that disclosed earlier. It should therefore be understood that the functional diagram in FIG. 2 represents only one example of controller 1 for implementing the invention, and that any other type of controller issuing identical output signals should be regarded as equivalent.

Each of the two memories 10, 20 is designed for a write or read access mode respectively when the corresponding access command R/W1 or R/W2 is equal to 0 or 1.

The first multiplexer 30 is designed to instantaneously reproduce at its output the signal applied to its first or second input respectively, when the switching signal SW1 applied to the command input of the multiplexer 30 is equal to 0 or 1. In other words, during each time interval, the output signal of the multiplexer 30 is equal to the signal applied to one of its two inputs. The multiplexer 40 has an identical operation to that of the multiplexer 30, transposed according to the switching signal SW2.

Under these conditions, for N again equal to 3, the operation of the storage device is characterized by Table 2 below, deduced from Table 1:

datum (second column of Table 2). When two alternative references are entered in a box of Table 2, the first reference corresponds to the value taken during a first execution of the storage device operating cycle, and the second reference corresponds to the value taken when the device's operating cycle has already been previously executed. A dash shown instead of a reference means the absence of any determined value for the output concerned, which occurs at the time of a first execution of the cycle, or corresponds to an operation not ending up in the issue of a determined value.

By comparing the last column of Table 2 showing the data successively issued by the output S of the device with the data produced at the input E (second column of Table 2), it can be seen that the operation of the storage device actually corresponds to that of a reverse stack of depth $2^N=2^3=8$.

It will be apparent to the person skilled in the art that the address ADDR1 and access command R/W1 values shown in Table 1 for the time intervals $2^N-2$, $2^N-1$, $2^{N+1}-2$ and $2^{N+1}-1$ can be replaced by other values, under condition that these replacements have no effect on the contents of the memory 10 written during the other time intervals. The overall reverse stack operation of Table 2 (last column of Table 2) then remains unchanged. Similarly, the values of ADDR2 and R/W2 shown for the time intervals $2^N-1$ and $2^{N+1}-1$ can be modified under the same conditions.

A second embodiment of a storage device according to the invention is now disclosed, which uses two immediate read SP-RAM type memory modules. The architecture of the device shown in FIG. 1 is used again for this second embodiment.

TABLE 2

| Time interval counter (100) | Source output (1000, E) | RAM1 access (12) | RAM1 output (31) | RAM2 access (13) | RAM2 output (32) | MUX1 output (42) | MUX2 output (51) | Flip-flop D output (52, S) |
|---|---|---|---|---|---|---|---|---|
| 0 | #0 | read | — | write | —/#14 | —#14 | —/#14 | —/#15 |
| 1 | #1 | write | —/#13 | read | — | —/#13 | —/#13 | —/#14 |
| 2 | #2 | read | — | write | —/#12 | —/#12 | —/#12 | —/#13 |
| 3 | #3 | write | —/#11 | read | — | —/#11 | —/#11 | —/#12 |
| 4 | #4 | read | — | write | —/#10 | —/#10 | —/#10 | —/#11 |
| 5 | #5 | write | —/#9 | read | — | —/#9 | —/#9 | —/#10 |
| 6 | #6 | read | — | write | —/#8 | —/#8 | —/#8 | —/#9 |
| 7 | #7 | write | —/#15 | read | — | —/#15 | —/#7 | —/#8 |
| 8 | #8 | read | — | write | #6 | #6 | #6 | #7 |
| 9 | #9 | write | #5 | read | — | #5 | #5 | #6 |
| 10 | #10 | read | — | write | #4 | #4 | #4 | #5 |
| 11 | #11 | write | #3 | read | — | #3 | #3 | #4 |
| 12 | #12 | read | — | write | #2 | #2 | #2 | #3 |
| 13 | #13 | write | #1 | read | — | #1 | #1 | #2 |
| 14 | #14 | read | — | write | #0 | #0 | #0 | #1 |
| 15 | #15 | write | #7 | read | — | #7 | #15 | #0 |

Figure 3:
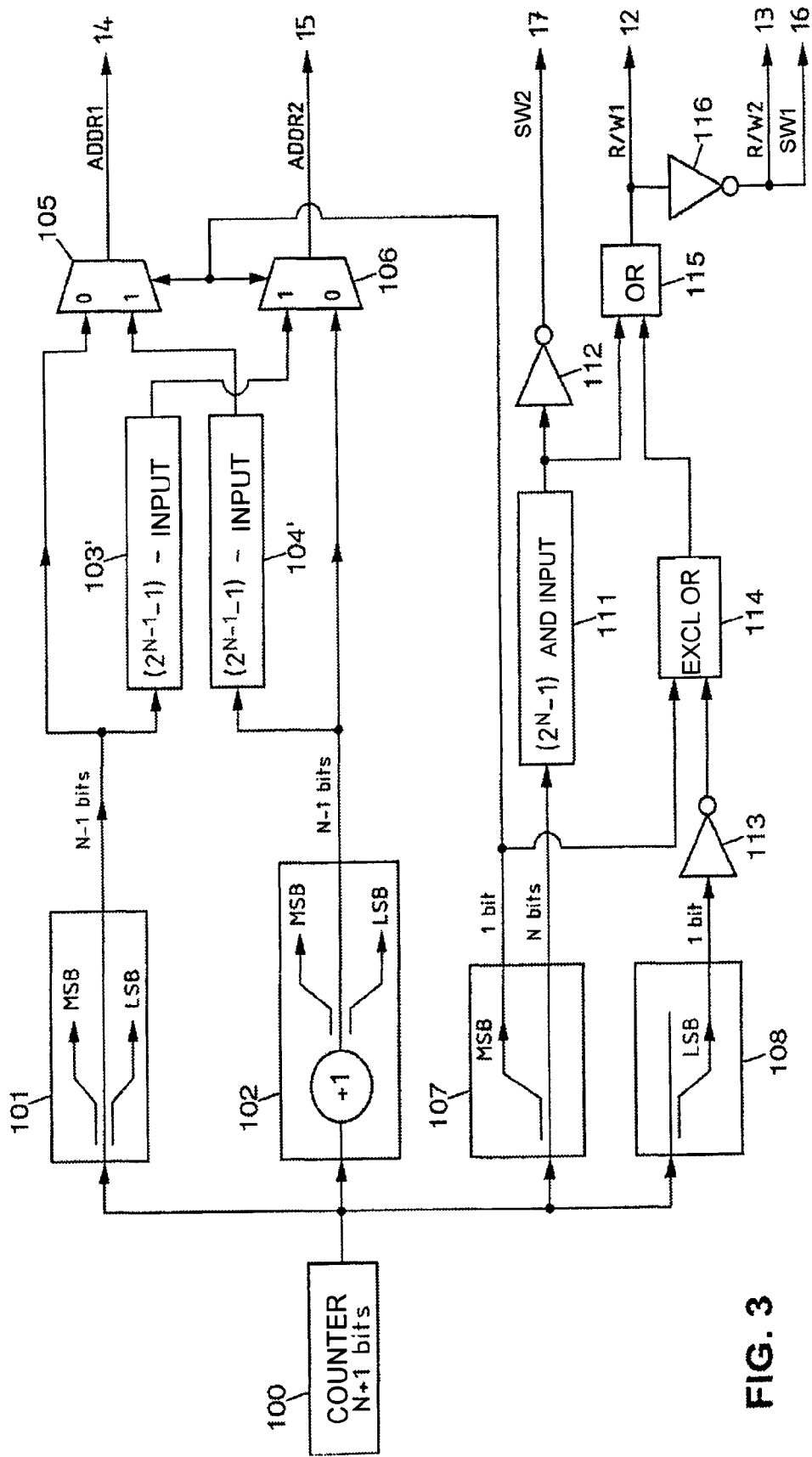
FIG. 3 is a functional diagram of a controller adapted for a storage device according to FIG. 1 using immediate read SP-RAM type memories.

In Table 2, each # sign indicates an identification number for the datum concerned, identified with respect to the time interval during which the source 1000 has produced this FIG. 3 shows the functional diagram of a controller 100 adapted for using immediate read SP-RAM memories. The controller 1 again includes counters 100, 101 and 102 based on the time interval in progress, identical to those disclosed in the first embodiment. The outputs of the counters 101 and 102 are respectively connected to the first inputs of the multiplexers 105 and 106. Furthermore, the outputs of the counters 101 and 102 are also connected to the inputs of two identical digital operators 103' and 104', each operating over N−1 bits. The operators 103' and 104' each subtract the values received as input from $2^{N-1}-1$. The output of the operator 103' is connected to the second input of the multiplexer 106, and that of the operator 104' is connected to the second input of the multiplexer 105.

Both multiplexers 105 and 106 receive at their respective command input, the most significant bit (MSB) of the count number for the time interval in progress produced by the counter 100. This most significant bit (MSB) is isolated by the separator 107. The multiplexers 105, 106 are set up to instantaneously reproduce at their respective output the signal received at their respective first or second input, when the signal received at their command input is equal to 0 or 1, respectively.

The output of the multiplexer 105 is connected to the output 14 of the controller 1, transmitting the address ADDR1, and the output of the multiplexer 106 is connected to the output 15, transmitting the address ADDR2.

The separator 107 further issues the N least significant bits (LSB) of the count number for the time interval in progress to the logical "AND" operator 111. The operator 111 compares the value received at its input with $2^N-1$, and issues at its output the binary signal 1 in the event of equality, otherwise the binary signal 0. This binary signal is sent to an inverter 112, whose output generates the second switching signal SW2 and is connected to the output 17 of the controller 1.

The separator 108 isolates the least significant bit (LSB) of the count number for the time interval in progress, and is connected to the input of the inverter 113. The outputs of the separator 107 and the inverter 113 respectively issuing the most significant bit (MSB) and a binary signal opposite to the least significant bit (LSB) of the count number for the time interval in progress are connected to the inputs of the logical operator 114, performing the "exclusive OR" logical operation, marked "EXCL_OR". A logical "OR" operator 115 receives as inputs the binary signals produced by the operators 111 and 114, and produces as output the access command R/W1 transmitted onto the output 12 of the controller 1. Finally, an inverter 116 produces the access command R/W2 from the output signal of the operator 115, and is connected to the output 13 of the controller 1. The signal SW1 transmitted onto the output 16 is identical to the access command R/W2.

Thus, the access commands R/W1 and R/W2 correspond, for each time interval, to the respective expressions:

R/W1=[$^c$C(0)) EXCL_OR C(N))] OR $^c$[SW2], and

R/W2=[C(0) EXCL_OR C(N)] OR $^c$[SW2], where:

C(0) is the least significant bit (LSB) of the time interval in progress,

C(N) is the most significant bit (MSB) of the time interval in progress, $^c$X designates the opposite value to the binary value X.

We can also use: R/W2=$^c$R/W1, R/W1 being again given by the first of the two formulae above.

The "OR" operator 115 may possibly be eliminated, together with its connection to the input of the operator 112. The output of the "EXCL_OR" operator 114 is then directly connected to the outputs 12 and 16 of the controller 1 and to the input of the inverter 116. The previous formulae then become:

R/W1=[$^c$C(0)) EXCL_OR C(N))], and

R/W2=$^c$R/W1.

Table 1a below corresponds to Table 1, transposed to the second embodiment, N again being taken as equal to 3, by way of example:

TABLE 1a

| Time interval counter (100) | First partial number (101) | W/R1 (12) | ADDR1 (14) | SW1 (16) | Second partial number (102) | W/R2 (13) | ADDR2 (15) | SW2 (17) |
|---|---|---|---|---|---|---|---|---|
| 0 | 00 | 1 | 0 | 0 | 00 | 0 | 0 | 1 |
| 1 | 00 | 0 | 0 | 1 | 01 | 1 | 1 | 1 |
| 2 | 01 | 1 | 1 | 0 | 01 | 0 | 1 | 1 |
| 3 | 01 | 0 | 1 | 1 | 10 | 1 | 2 | 1 |
| 4 | 10 | 1 | 2 | 0 | 10 | 0 | 2 | 1 |
| 5 | 10 | 0 | 2 | 1 | 11 | 1 | 3 | 1 |
| 6 | 11 | 1 | 3 | 0 | 11 | 0 | 3 | 1 |
| 7 | 11 | 0 | 3 | 1 | 00 | 1 | 0 | 0 |
| 8 | 00 | 0 | 3 | 1 | 00 | 1 | 3 | 1 |
| 9 | 00 | 1 | 2 | 0 | 01 | 0 | 3 | 1 |
| 10 | 01 | 0 | 2 | 1 | 01 | 1 | 2 | 1 |
| 11 | 01 | 1 | 1 | 0 | 10 | 0 | 2 | 1 |
| 12 | 10 | 0 | 1 | 1 | 10 | 1 | 1 | 1 |
| 13 | 10 | 1 | 0 | 0 | 11 | 0 | 1 | 1 |
| 14 | 11 | 0 | 0 | 1 | 11 | 1 | 0 | 1 |
| 15 | 11 | 1 | 3 | 0 | 00 | 0 | 0 | 0 |
| 16 = 0 | 00 | 1 | 0 | 0 | 00 | 0 | 0 | 1 |

The memories 10 and 20 and the multiplexers 30 and 40 each have identical operations to those disclosed for the first embodiment. Table 2a below is then deduced from Table 1a in reference to FIG. 1:

TABLE 2a

| Time interval counter (100) | Source output (1000, E) | RAM1 access (12) | RAM1 output (31) | RAM2 access (13) | RAM2 output (32) | MUX1 output (42) | MUX2 output (51) | Poret D output (52, S) |
|---|---|---|---|---|---|---|---|---|
| 0 | #0 | read | —/#14 | write | — | —/#14 | —/#14 | —/#15 |
| 1 | #1 | write | — | read | —/#13 | —/#13 | —/#13 | —/#14 |
| 2 | #2 | read | —/#12 | write | — | —/#12 | —/#12 | —/#13 |
| 3 | #3 | write | — | read | —/#11 | —/#11 | —/#11 | —/#12 |
| 4 | #4 | read | —/#10 | write | — | —/#10 | —/#10 | —/#11 |
| 5 | #5 | write | — | read | —/#9 | —/#9 | —/#9 | —/#10 |
| 6 | #6 | read | —/#8 | write | — | —/#8 | —/#8 | —/#9 |
| 7 | #7 | write | — | read | —/#0 | —/#0 | —/#7 | —/#8 |
| 8 | #8 | write | — | read | #6 | #6 | #6 | #7 |
| 9 | #9 | read | #5 | write | — | #5 | #5 | #6 |
| 10 | #10 | write | — | read | #4 | #4 | #4 | #5 |
| 11 | #11 | read | #3 | write | — | #3 | #3 | #4 |
| 12 | #12 | write | — | read | #2 | #2 | #2 | #3 |
| 13 | #13 | read | #1 | write | — | #1 | #1 | #2 |
| 14 | #14 | write | — | read | #0 | #0 | #0 | #1 |
| 15 | #15 | write | — | read | #0 | #0 | #15 | #0 |

It will be obvious to the person skilled in the art on looking at Tables 1a and 2a that the access command and address values R/W1, ADDR1, R/W2 and ADDR2 can be replaced by values without any effect on the contents of the memories 10, 20 for instants $2^N-1$ and $2^{N+1}-1$. The data issued at each time interval by the storage device then remain identical.

The second embodiment again matches well with an operation of a reverse stack of depth $2^N$.

It is understood that, for both embodiments disclosed, the memories 10, 20 and the multiplexers 30, 40, 105 and 106 may be replaced by similar elements for which the access commands or the switching signals are the reverse of those mentioned earlier. Accordingly, the controller 1 must then be adapted, without the principle of the invention and the architecture of the storage device depicted in FIG. 1 being modified.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A storage device, comprising:

two random access memories each having at least $2^{N-1}$ locations for storing data at respective addresses, N being an integer greater than 1, a data input connected to a data source, a command input, an address input and an output;

multiplexing means having first and second data inputs respectively connected to the data outputs of the two memories, a third data input connected to the data source and an output reproducing data present at one of said first, second and third data inputs, selected by switching signals;

a controller for issuing electrical signals, within successive time intervals, on controller's outputs including two access command outputs respectively connected to the command inputs of the two memories, two address outputs respectively connected to the address inputs of the two memories and at least a switching command output for issuing said switching signals; and means for sampling the output of the multiplexing means at the beginning of each time interval and producing output data of the device, wherein the controller is set up for issuing, in the course of two consecutive sequences of $2^N$ time intervals:

on each of the two access command outputs, and for at least time intervals distinct from the boundaries of the two sequences, alternate read and write access conunands, a write access command being issued on one of said access command outputs while a read access command is issued on the other access command output and vice versa;

on each of the two address outputs, increasing addresses during one of the two sequences and decreasing addresses during the other sequence, such that, for at least time intervals distinct from the boundaries of the two sequences, the address input of each memory receives the same address in the course of two consecutive time intervals of each sequence during which the command input of said memory receives a read access command and then a write access command; and on each switching command output, switching signals set so that in the course of each sequence, the sampling means produce data originating from the source in a reverse chronological order from the chronological order of arrival of said data from the source;

wherein, during at least one time interval at a boundary of each sequence, the switching signals are issued so that the output of the multiplexing means reproduces data present at said third data input.

2. The device according to claim 1, wherein the controller is set up for coding the addresses of each memory over N−1 bits.

3. The device according to claim 1, wherein the means for sampling the output of the multiplexing means include a flip-flop D.

4. The device according to claim 1, wherein the two memories are deferred read memories, the data read in each memory being produced at the output of said memory during the time interval immediately following the time interval during which the command input of said memory receives a read access command and the address input of said memory receives an address.

5. A storage device, comprising:
two random access memories each having at least $2^{N-1}$ locations for storing data at respective addresses, N being an integer greater than 1, a data input connected to a data source, a command input, an address input and an output;
multiplexing means having first and second data inputs respectively connected to the data outputs of the two memories, a third data input connected to the data source and an output reproducing data present at one of said first, second and third data inputs, selected by switching signals;
a controller for issuing electrical signals, within successive time intervals, on controller's outputs including two access command outputs respectively connected to the command inputs of the two memories, two address outputs respectively connected to the address inputs of the two memories and at least a switching command output for issuing said switching signals; and
means for sampling the output of the multiplexing means at the beginning of each time interval and producing output data of the device,
wherein the controller is set up for issuing, in the course of two consecutive sequences of $2^N$ time intervals:
on each of the two access command outputs, and for at least time intervals distinct from the boundaries of the two sequences, alternate read and write access commands, a write access command being issued on one of said access command outputs while a read access command is issued on the other access command output and vice versa;
on each of the two address outputs, increasing addresses during one of the two sequences and decreasing addresses during the other sequence, such that, for at least time intervals distinct from the boundaries of the two sequences, the address input of each memory receives the same address in the course of two consecutive time intervals of each sequence during which the command input of said memory receives a read access command and then a write access command; and
on each switching command output, switching signals set so that in the course of each sequence, the sampling means produce data originating from the source in a reverse chronological order from the chronological order of arrival of said data from the source;
wherein the multiplexing means include:
a first multiplexer having:
a switching command input connected to a first switching command output of the controller,
first and a second data inputs connected respectively to the outputs of the two memories, and
an output reproducing the signals from the first or second input of said first multiplexer according to a first switching signal applied to the command input of said first multiplexer; and a second multiplexer having:
a switching command input connected to a second switching command output of the controller,
first and second data inputs connected respectively to the data source and to the output of the first multiplexer, and
an output reproducing the signals from the first or second input of said second multiplexer according to a second switching signal applied to the command input of said second multiplexer.

6. The device according to claim 5, wherein the controller is set up so that the first switching signal and the access command issued by the controller to one of the two memories are identical binary signals, for at least time intervals distinct from the boundaries of the two sequences.

7. The device according to claim 5, wherein the two memories are deferred read memories, the data read in each memory being produced at the output of said memory during the time interval immediately following the time interval during which the command input of said memory receives a read access command and the address input of said memory receives an address, and wherein the controller comprises:
a cyclic counter of the time intervals of the two consecutive sequences, set up to produce a number over N+1 bits, between 0 and $2^{N+1}-1$, for counting the time interval in progress;
means for generating at a first access command output connected to a first of the two memories a first binary access command opposite to the least significant bit of the count number of the time interval in progress, during the time intervals respectively numbered from 0 to $2^N-3$ and from $2^N$ to $2^{N+1}-3$;
means for generating the second access command at a second access command output connected to the second of the two memories in the form of the least significant bit of the count number of the time interval in progress, during the time intervals respectively numbered from 0 to $2^N-2$ and from $2^N$ to $2^{N+1}-2$;
means for producing, during each time interval, a first partial time interval count number over N−1 bits, equal to the count number for the time interval in progress from which the most significant bit and the least significant bit have been removed;
means for generating at a first address output connected to the address input of said first memory an address equal to the first partial count number during the time intervals respectively numbered from 0 to $2^N-3$, and equal to $2^{N-1}-2$ from which the first partial count number is subtracted during the time intervals respectively numbered from $2^N$ to $2^{N+1}-3$;
means for producing, during each time interval, a second partial time interval count number over N−1 bits, equal to the count number for the time interval in progress to which 1 is added, then from which the most significant bit and the least significant bit have been removed;
means for generating at a second address output connected to the address input of said second memory an address equal to the second partial count number during the time intervals respectively numbered from 0 to $2^N-2$, and equal to $2^{N-1}-1$ from which the second partial count number is subtracted during the time intervals respectively numbered from $2^N$ to $2^{N+1}-2$;
means for generating at the first switching command output the first switching signal in the form of a binary signal opposite to said first access command;
means for generating at the second switching command output the second switching signal in the form of a binary signal equal to 1 when the count number for the time interval in progress, reduced to the N least significant bits, is equal to $2^N-1$, and equal to 0 otherwise;

each of the two memories being in write or read access mode when the corresponding access command is equal to 0 or 1, respectively;

the first and second multiplexer each being set up to instantaneously reproduce at the output of said multiplexer a signal applied to the first or second input of said multiplexer, when the switching signal applied to the command input of said multiplexer is equal to 0 or 1, respectively.

8. The device according to claim 7, wherein:

the means of the controller for generating the first access command are set up to produce, during each time interval, a binary signal opposite to the least significant bit of the count number for the time interval in progress;

the means of the controller for generating an address at said first address output are set up to produce an address equal to the first partial count number during the time intervals respectively numbered from 0 to $2^N-1$, and equal to $2^{N-1}-2$ from which the first partial count number is subtracted during the time intervals respectively numbered from $2^N$ to $2^{N+1}-1$;

the means of the controller for generating the second access command are set up to produce, during each time interval, a signal equal to the least significant bit of the time interval in progress; and the means of the controller for generating an address at said second address output are set up to produce an address equal to the second partial count number during the time intervals respectively numbered from 0 to $2^N-2$ or numbered $2^{N+1}-1$, and equal to $2^{N-1}-1$ from which the second partial count number is subtracted during the time intervals respectively numbered from $2^N$ to $2^{N+1}-1$, or numbered $2^N-1$.

9. The device according to claim 8, wherein the controller comprises:

a first internal multiplexer having a first input connected to receive the first partial count number, a second input connected to receive the value, over N−1 bits, of $2^{N-1}-2$ from which the first partial count number is subtracted, a command input connected to receive the most significant bit of the count number for the time interval in progress, and set up to reproduce at an output connected to the first address output of the controller the value received on the first or second input of said first internal multiplexer, when the value applied to the command input of said first internal multiplexer is 0 or 1, respectively; and a second internal multiplexer having a first input connected to receive the second partial count number, a second input connected to receive the value, over N−1 bits, of $2^{N-1}-1$ from which the second partial count number is subtracted, a command input connected to receive the most significant bit of the count number for the time interval in progress to which 1 is added, and set up to reproduce at an output connected to the second address output of the controller the value received at the first or second input of said second internal multiplexer, when the value applied to the command input of said second internal multiplexer is 0 or 1, respectively.

10. The device according to claim 5, wherein the memories are instant read memories, the data read in each memory being produced at the output of said memory in the time interval during which the command input of said memory receives a read access command and the address input of said memory receives an address, and wherein the controller comprises:

a cyclic counter of the time intervals of the two consecutive sequences, set up to produce a number over N+1 bits, between 0 and $2^{N+1}-1$, for counting the time interval in progress;

means for producing, during each time interval, a first partial time interval count number over N−1 bits, equal to the count number for the time interval in progress from which the most significant bit and the least significant bit have been removed;

means for producing, during each interval, a second partial time interval count number over N−1 bits, equal to the count number for the time interval in progress to which 1 is added, then from which the most significant bit and the least significant bit have been removed;

means for generating at said second switching command output the second switching signal in the form of a binary signal equal to 0 when the count number for the time interval in progress, reduced to the N least significant bits, is equal to $2^N-1$, and equal to 1 otherwise;

means for generating at a first address output connected to the address input of a first of the two memories an address equal to the first partial count number during the time N intervals respectively numbered from 0 to $2^N-2$, and equal to $2^{N-1}-1$ from which the second partial count number is subtracted during the time intervals respectively numbered from $2^N$ to $2^{N+1}-2$;

means for generating at a second address output connected to the address input of a second of the two memories an address equal to the second partial count number during the time intervals respectively numbered from 0 to $2^N-2$, and equal to $2^{N-1}-1$ from which the first partial count number is subtracted during the time intervals respectively numbered from $2^N$ to $2^{N+1}-2$;

means for generating at a first access command output connected to said first memory a first binary access command, for the time intervals numbered other than $2^N-1$ and $2^{N+1}-1$, equal to:

[$^C$C(0) EXCL_OR C(N)] OR $^C$[second switching signal], where:

C(0) is the least significant bit of the time interval in progress,

C(N) is the most significant bit of the time interval in progress,

EXCL_OR is the "exclusive OR" binary operator, $^C$X designates the opposite value to the binary value X;

means for generating at the second access command output connected to said second memory a second binary access command equal to [C(0) EXCL_OR C(N)] OR $^C$[second switching signal], for the time intervals respectively numbered other than $2^N-1$ and $2^{N+1}-1$;

means for generating at the first switching command output a binary signal opposite to the first access command;

each of the two memories being in write or read access mode when the corresponding access command is equal to 0 or 1, respectively;

the first and second multiplexer each being set up to reproduce at the output of said multiplexer a signal applied to the first or second input of said multiplexer, when the switching signal applied to the command input of said multiplexer is equal to 0 or 1, respectively.

11. The device according to claim 10, wherein:
the means of the controller for generating the first access command are set up to produce, during each time interval, a binary signal equal to [$^CC(\mathbf{0})$ EXCL_OR C(N)];
the means of the controller for generating the second access command are set up to produce, during each time interval, a binary signal opposite to the first access command;
the means for generating an address at the first address output are set up to produce a signal equal to the first partial count number during the time intervals respectively numbered from 0 to $2^N-1$, and equal to $2^{N-1}-1$ from which the second partial count number is subtracted during the time intervals respectively numbered $2^N$ to $2^{N+1}-1$;
the means for generating an address at the second address output are set up to produce a signal equal to the second partial count number during the time intervals respectively numbered from 0 to $2^N-1$, and equal to $2^{N-1}-1$ from which the first partial count number is subtracted during the time intervals respectively numbered $2^N$ to $2^{N+1}-1$.

12. The device according to claim 11, wherein the controller comprises:
a first internal multiplexer having a first input connected to receive the first partial count number, a second input connected to receive the value, over N−1 bits, of $2^{N-1}-1$ from which the second partial count number is subtracted, a command input connected to receive the most significant bit of the count number for the time interval in progress, and set up to reproduce at an output connected to the first address output of the controller the value received at the first or second input of said first internal multiplexer, when the value applied to the command input of said first internal multiplexer is 0 or 1, respectively; and
a second internal multiplexer having a first input connected to receive the second partial count number, a second input connected to receive the value, over N−1 bits, of $2^{N-1}-1$ from which the first partial count number is subtracted, a command input connected to receive the most significant bit of the count number for the time interval in progress, and set up to reproduce at an output connected to the second address output of the controller the value received at the first or second input of said second internal multiplexer, when the value applied to the command input of said second internal multiplexer is 0 or 1, respectively.

13. The device according to claim 1, wherein the memories are instant read memories, the data read in each memory being produced at the output of said memory in the time interval during which the command input of said memory receives a read access command and the address input of said memory receives an address.

14. A method of data storage comprising the following steps each carried out within successive time intervals of two consecutive sequences of 2N time intervals, N being an integer greater than 1:
issuing a data from a data source to two random access memories, each memory having at least $2^{N-1}$ locations for storing data at respective addresses, while issuing directly said data to a multiplexer further connected to respective data outputs of the two memories;
for at least time intervals distinct from the boundaries of the two sequences, issuing alternate read and write access commands respectively to each of the two random access memories, a write access command being issued to one of the memories while a read access command is issued to the other memory and vice versa;
issuing to each memory, increasing addresses during one of the two sequences and decreasing addresses during the other sequence, such that, for at least time intervals distinct from boundaries of the two sequences, each memory receives the same address in the course of two consecutive time intervals of each sequence during which said memory receives a read access command and then a write access command;
issuing switching signals to the multiplexer, the switching signals causing the multiplexer to reproduce on an output either the data received directly from the data source or the data received from one of the two memories, as selected by the switching signals, so that in the course of each sequence, data is produced which originates from the source in a reverse chronological order from the chronological order of arrival of said data from the source; and
issuing switching signals, during at least one time interval at a boundary of each sequence, so that the output of the multiplexor reproduces data issued directly to the multiplexor from the data source.

15. A data storage device, comprising:
two random access memories for storing data at respective addresses, a data input connected to a data source, a command input, an address input and an output;
a multiplexor having first and second data inputs respectively connected to the data outputs of the two memories and an output reproducing data present at one of said first and second data inputs;
a controller for issuing command signals to the command inputs of the two memories, address signals to the address inputs of the two memories and switching signals to the multiplexor; and
a logic device to sample the output of the multiplexor and produce output data,
wherein the controller issues:
alternate read/write command signals to the two random access memories so as to write data to one memory while reading data from another memory;
address signals to the address inputs of the two random access memories, while alternate read/write command signals are provided, comprising increasing address values followed by decreasing address values;
switching signals to the multiplexor to alternately select between the two random access memories with respect to data read from the memories; and
a second multiplexor having first and second data inputs respectively connected to the outputs of the first multiplexor and a source of data and an output reproducing data present at one of said first and second data inputs;
wherein the controller issues switching signals to the second multiplexor to selectively output data received from the source of data instead of data received from the multiplexor.

* * * * *

UNITED STATES PATENT AND TRADEMARK OFFICE
CERTIFICATE OF CORRECTION

PATENT NO. : 7,139,865 B2 Page 1 of 1
APPLICATION NO. : 10/669886
DATED : November 21, 2006
INVENTOR(S) : Pascal Urard It is certified that error appears in the above-identified patent and that said Letters Patent is hereby corrected as shown below:

Column 12, line 41, Replace "conunands, a write"
Claim 1 With --commands, a write--

Signed and Sealed this

Twenty-second Day of May, 2007

JON W. DUDAS
*Director of the United States Patent and Trademark Office*